Figure 1:
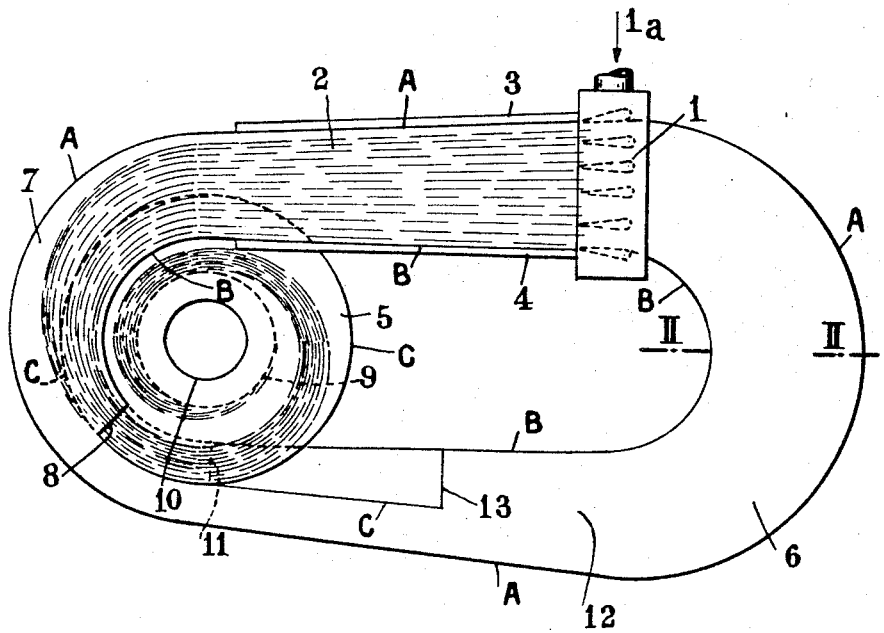

Dec. 3, 1968   R. BIDARD   3,414,745
POWER PLANT FOR TRANSFORMING ENERGY BY UTILIZATION
OF THE MAGNETOHYDRODYNAMIC EFFECT
Filed Jan. 7, 1966   5 Sheets-Sheet 1

Inventor
René Bidard
By Pierce, Scheffler & Parker
Attorneys

Dec. 3, 1968     R. BIDARD     3,414,745
POWER PLANT FOR TRANSFORMING ENERGY BY UTILIZATION
OF THE MAGNETOHYDRODYNAMIC EFFECT
Filed Jan. 7, 1966                                         5 Sheets-Sheet 2
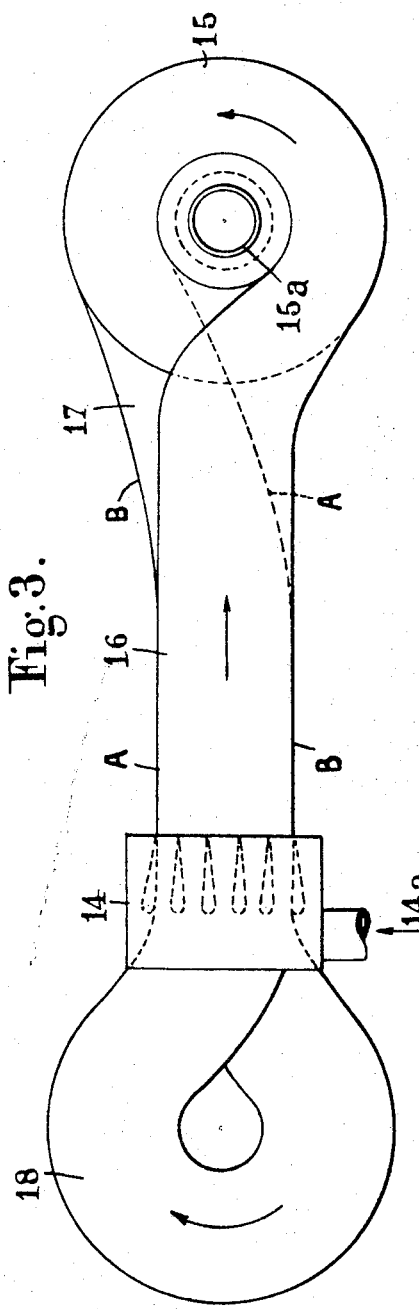
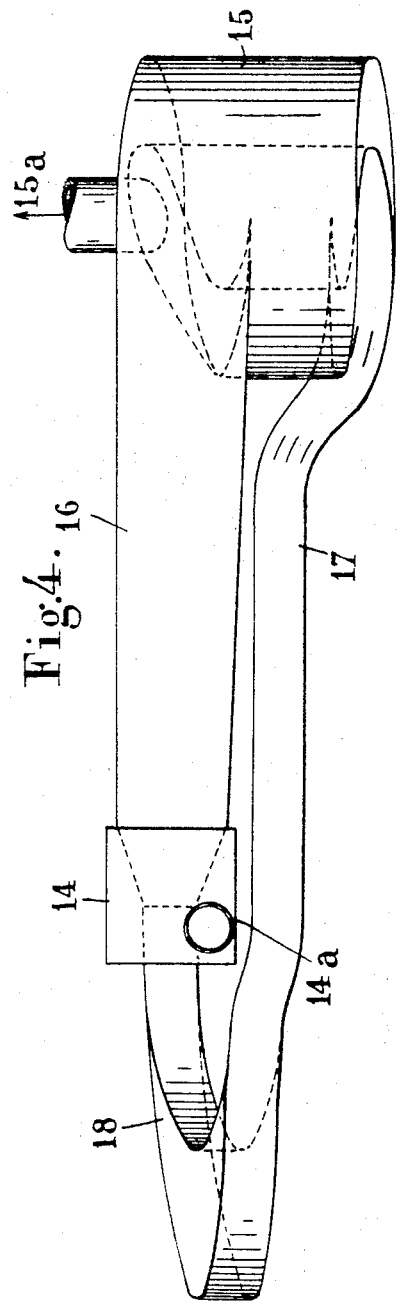
Inventor
René Bidard
By Pierre, Scheffler & Parker
Attorneys Dec. 3, 1968 R. BIDARD 3,414,745
POWER PLANT FOR TRANSFORMING ENERGY BY UTILIZATION
OF THE MAGNETOHYDRODYNAMIC EFFECT
Filed Jan. 7, 1966 5 Sheets-Sheet 3
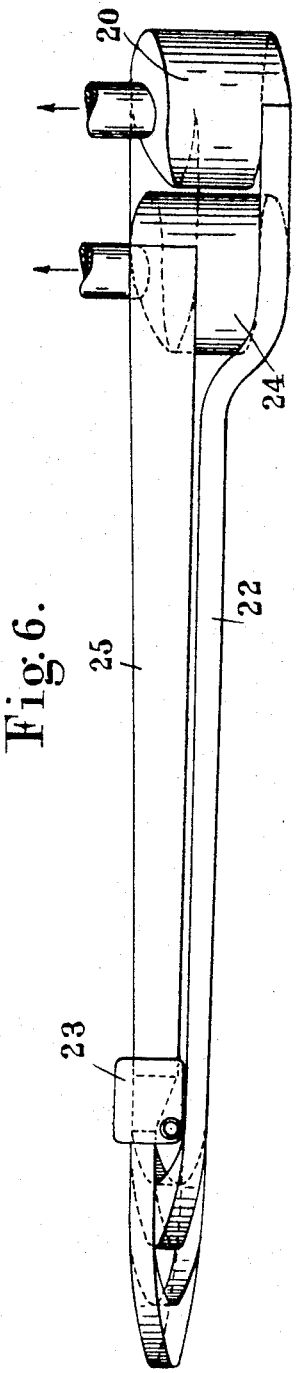
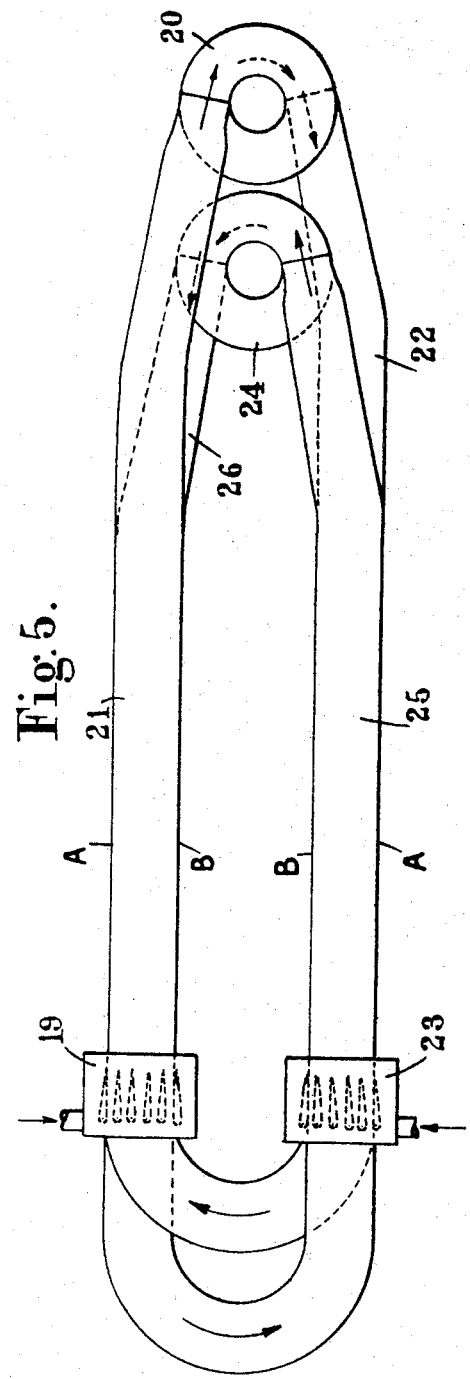
Inventor
René Bidard
By Pierce, Scheffler & Parker
Attorneys Dec. 3, 1968 R. BIDARD 3,414,745
POWER PLANT FOR TRANSFORMING ENERGY BY UTILIZATION
OF THE MAGNETOHYDRODYNAMIC EFFECT
Filed Jan. 7, 1966 5 Sheets-Sheet 4
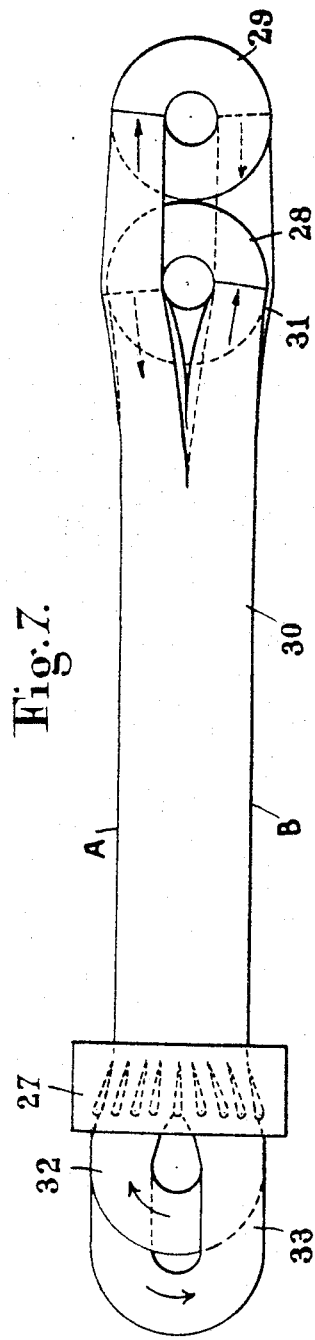
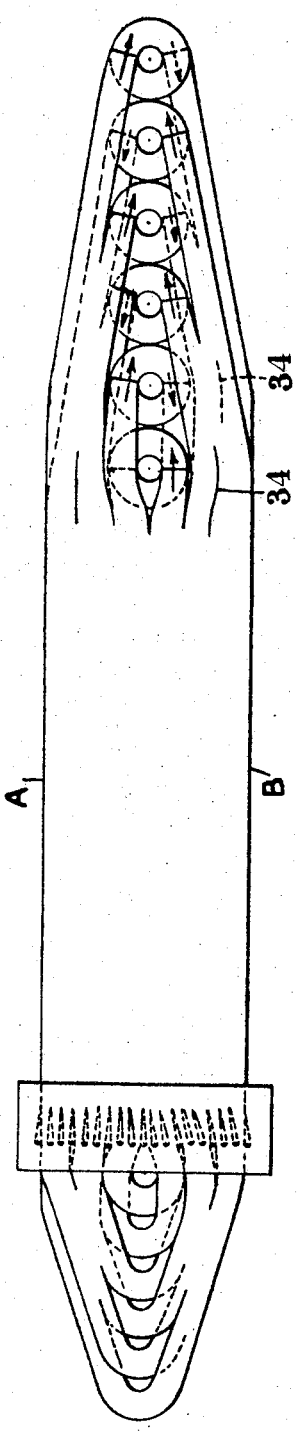
Inventor
René Bidard
By Pierce, Scheffler & Parker
Attorneys

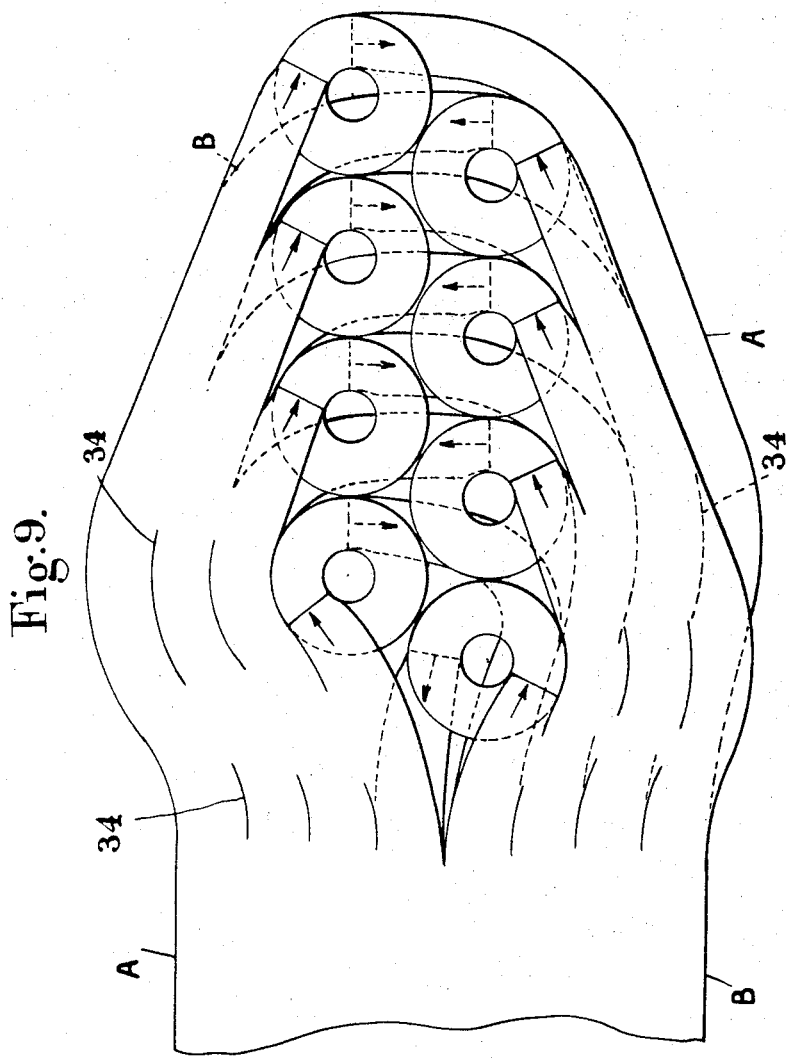

United States Patent Office 3,414,745
Patented Dec. 3, 1968

3,414,745
POWER PLANT FOR TRANSFORMING ENERGY BY UTILIZATION OF THE MAGNETOHYDRODYNAMIC EFFECT
René Bidard, Paris, France, assignor to Cie Electro-Mecanique, Paris, France, a body corporate of France
Filed Jan. 7, 1966, Ser. No. 519,202
Claims priority, application France, Jan. 29, 1965, 3,706
12 Claims. (Cl. 310—11)

This invention relates to an improvement in power plants of the magnetohydrodynamic type for transformation of energy.

It is already known to produce heat cycles by means of magnetohydrodynamic machines traversed by an emulsified fluid formed of an electrically conductive liquid, on the one hand, and of a compressible gas, which is little soluble in the said liquid and dispersed in this same fluid in the form of fine bubbles, on the other hand.

Such a complex emulsified, and preferably cooled, fluid can then be compressed and also expanded after heating, these compressions and expansions being effected in magnetohydrodynamic machines. One can also realize with these devices a heat cycle capable of producing electric power by consuming the heat without the use of rotary machines.

It is also known to use as elements of these cycles one or several loops of conductive liquid in which this liquid circulates in a closed circuit where the potential energy of the gas is transformed into electric energy (or vice versa) in a magnetohydrodynamic machine.

These loops comprise then successively on the path of the conductive liquid an emulsifier, thanks to which the gas to be expanded (or compressed) is introduced into the loop, a magnetohydrodynamic generator (or motor) in which the emulsion circulates, a device for separating the gas bubbles, thanks to which the expanded (or compressed) gas is extracted from the loop, and finally a device for restoring the pressure of the liquid to its original value, which can itself be magnetohydrodynamic, but which acts this time on the unemulsified liquid (pump or turbine).

Finally, such a loop can comprise in addition a device destined to supply or remove heat in the liquid or in the emulsion.

A very serious inconvenience of these plants is that the conductive fluid, whether emulsified or not, must enter the magnetic flux of the magnetohydrodynamic machines and issue therefrom, because great electric losses, so-called "end losses" appear then in the inlet and outlet regions.

The present invention permits elimination of these losses in plants of the above mentioned type, which comprise self-contained loops of conductive fluid and which traverse magnetohydrodynamic conversion apparatus with a transverse magnetic field.

It is characterized in that the loop(s) as well as the apparatus or parts of apparatus traversed by all or part of the said fluid are arranged entirely in the said magnetic field, so that no electrically conductive fluid enters or leaves this field, and that measures are taken to avoid any electric eddy current inside the said fluid.

By thus arranging all the elements of the loop in the magnetic field, the said end losses are eliminated. But with this arrangement it is necessary to prevent the creation of other eddy currents in the conductive fluid by the magnetohydrodynamic effect.

To this end a solution consists, on the one hand, in using a magnetic field of constant size and direction and, on the other hand, taking into account that this fluid is compressible and assuming that its flow is continuous, in circulating the entire conductive fluid of the loop in a pipe with a quadrilateral cross section comprising two walls A and B parallel to the field in order to obtain flow lines which are substantially plane and perpendicular to the direction of the said magnetic field, the height of the flow channel, assumed parallel to the magnetic field, being such that it varies in inverse proportion to the volume—true weight of the conductive fluid at each point of flow.

In this way, the electromotive force generated by the magnetohydrodynamic effect between the two walls A and B parallel to the magnetic field is constant in all regions of the loop, and this induced electromotive force is zero for any entire closed circuit in the conductive fluid. If the same is to hold true for the potential difference, it is necessary that the ohmic drops in the regions traversed by a current are negligible. Since this condition is not realized as soon as this current attains a certain value, the velocity of the fluid must be slightly changed: by increasing it in the generating region, by reducing it in the receiving region. This can be obtained by changing in these regions the above mentioned height of the duct parallel to the field. Since the potential difference between these walls is thus substantially constant over their entire length, they can be completely conductive or only in the generating region and in the receiving region. On the other hand, the other two walls of the pipe must be insulating transverse to the displacement of the fluid.

Several embodiments according to the invention are described below by way of non-limiting examples.

Figure 2:
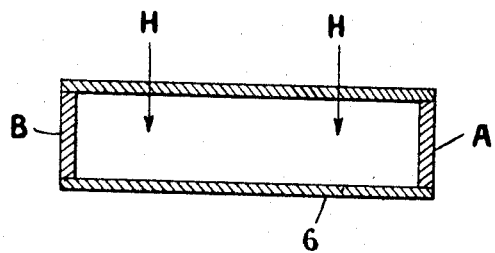

FIG. 1 illustrates the basic idea of the invention;
FIG. 2 is a section of FIG. 1 along section-line II—II;
FIGS. 3 and 4 show in plan and side elevation respectively, one practical embodiment for the invention utilizing a single loop;
FIGS. 5 and 6 show in plan and side elevation respectively another practical embodiment of the invention and which utilizes a pair of loops, each with its own emulsifier and separator units;
FIG. 7 illustrates in plan another embodiment utilizing two loops with a portion of the vertical walls of the loops in common, there being one common emulsifier unit for the two loops but individual separator units for the loops;
FIG. 8 is also a plan view of an embodiment which utilizes three pairs of loops, each with its own separator unit and there being a common emulsifier unit; and
FIG. 9 is a partial plan view of an embodiment similar to FIG. 8 but which utilizes four pairs of loops and a somewhat different ducting arrangement for connecting the inlets and outlets for the several separator units.

These figures concern plants which generate electricity by the magnetohydrodynamic effect. The generator proper is a tuyère traversed by a complex fluid formed of a heat-carrying gas suitably incorporated in the form of bubbles in an electrically conductive liquid. This complex fluid is formed in an emulsifier upstream of the said tuyère. Downstream of the latter, it is separated into its constituents which, after having been brought each to their original temperature and pressure, are conducted back to the emulsifier. The liquid forms thus a closed conductive loop whose flow is continuous. Both in the various apparatus mentioned above and in the pipe which connects them with each other, the cross section of the liquid passageway is quadilateral, where two sides A and B are parallel to the magnetic field. The assembly is so arranged that the flow is substantially plane.

In all these figures, A and B designate more particularly the two walls parallel to the magnetic field, closed in themselves, between which circulates the total flow of the conductive fluid, whether emulsified or not. In the plan views, the upper wall of the pipe(s) connecting the apparatus with each other has been omitted.

A constant magnetic field H is produced by an induction coil (not represented) so that its direction is perpendicular to the plane of flow and that it extends in the entire space comprised between the said walls A and B. The arrangement of the emulsifier and that of the separator inside this space is such that no electro-conductive fluid can either enter or leave this field. Consequently there are no "end losses." These arrangements permit nevertheless the direct transformation of thermal energy into electric energy, or vice versa, if the gas enters the emulsifier with a different pressure than that with which it leaves the separator.

In order to avoid the circulation of eddy currents in the conductive liquid, the size of the walls A and B varies along the loop according to the above mentioned law of inverse proportion, modified in the generating and receiving regions, as indicated above.

In the loop of FIG. 1, 1 represents an emulsifier, 2 a tuyère, 3 and 4 the electrodes for the passage of the current, 5 one or more separators with vortex, and 6 the pipe which conducts the conductive liquid to the emulsifier.

The emulsifier 1 is represented by a plurality of cylindrical tubes generated parallel to the direction of the magnetic field, with aerodynamic cross sections provided with numerous very fine holes, inside of which arrives the compressed gas, which is heated by means of devices outside the said loop and which are not represented.

This gas introduced along the arrow 1a flows into the liquid through the above mentioned holes and mixes there in the form of fine bubbles. This liquid has itself been put under pressure in another part of the loop.

The complex fluid thus formed expands in the magnetohydrodynamic tuyère 2 and the electric current produced circulates between the electrodes 3 and 4, each of them being equipotential in its entire extension.

Then, without leaving the magnetic field, the complex fluid thus expanded follows a bend 7 in which a partial separation of the bubbles is produced, the latter accumulating toward the region with a lower pressure, that is, toward the axis of rotation.

After having thus described a certain circular arc, a more or less large portion of the liquid flow, namely that which still contains bubbles, is captured through an orifice 8, then deflected down and directed toward the separator 5 where a vortex prevails, which is limited by the wall C and in which the fluid can effect one or more turns in a descending spiral with a constant outside radius (that of the wall C), and in which the separation of the bubbles can be completed; these bubbles are removed through the natural, substantially cylindrical level 9 of the liquid in the center of the vortex. The expanded gas thus separated issues through an orifice 10 arranged above, in the axis of the vortex.

The liquid, liberated of the bubbles, is then taken up by an orifice 11 arranged in the lower part of the separator, between the same radii as the orifice 8, and is brought to the upper level in the duct 12 through an orifice 13; there the liquid meets the fluid which has not had to pass through the separator. Naturally such a separator can only function if a certain charge loss is accepted on the useful pressure of the gas.

As it will be seen below, it is essential that each fluid stream which enters the vortex at 8 can issue at 11 with the same radius as it entered, which implies that the orifices 8 and 11 are comprised between the same two radii.

The duct 12 is so designed that the pressure of the liquid is restored there to the initial value either by transformation of its kinetic energy into pressure (diffusion effect) or by the magnetohydrodynamic pumping effect or by both effects combined.

The nature of the function of the duct 12 is more or less close to one of its modes, depending on the manner in which its width along the flow is evaluated and according to the height to be given to it (which is constant, since the density of the liquid is constant).

If one desires to have a pure diffusion effect at the nominal charge, it suffices to provide its height so that the magnetohydrodynamic potential difference generated between the side walls of this duct 12 has the exact value of the potential difference existing between the generating electrode 3 and 4 of the tuyère at the charge under consideration. No electric current will then circulate between A and B in the duct 12, and in this case the walls A and B of the duct 12 could also be electrically insulating.

On the other hand, it suffices to create a small difference on this electromotive force, compensating the ohmic potential drop to be created, to circulate an electric current either in one or in the other direction between the side walls of the duct 12 made conductive to this end and to permit this region to exchange the electric energy with the generating region 2 with which it is to this end connected in parallel, either by outside electrical connections of these side walls with the electrodes 3 and 4 respectively or by the walls A and B of the rest of the loop itself, if these walls are conductive from one end to the other; the diffusion effect will then be completed by magnetohydrodynamic pumping, if the exchange of energy takes place in one direction, or by a transformation of excess kinetic energy into useful electric energy, if on the other hand the exchange of energy takes place in the other direction.

Naturally it is also possible to obtain such a pumping effect by connecting the electrodes of the duct 12 to a suitable outside potential source.

The magnetohydrodynamic operation of the bubble separator 5 will now be examined. It is essential that each liquid stream which enters the vortex with a certain radius, leave it with the same radius, because otherwise, since the different turns described by the fluid are not insulated from each other, there would be a circulation of an electric circular current of the same axis as the vortex and opposing this radial flow of the fluid.

In such a vortex, the velocities are inversely proportional to the radii, the pressure evolved in opposite direction, and the electric potential follows an exponent flow as a function of the radius. The electric equipotential surfaces in a magnetic field, which is constant and parallel to the axis of the said vortex, are circular cylindrical surfaces having the same axis. The result is that the outer wall C is equipotential as desired. As far as the total height of the vortex perpendicularly to the plane of flow is concerned, it must follow the above mentioned law of inverse proportionality to the volumetric weight, the flow of each turn being considered as separated from the preceding ones and the following ones by an imaginary helicoidal surface.

It is essential that this separator is located entirely in the constant magnetic field, so that the desired electric potentials are effectively present.

In order to simplify the figure, the heat supply system has not been represented.

Such a system could be formed of cylindrical generator tubes parallel to the magnetic field, and very similar to those of the emulsifier tubes which are traversed by a suitable heat-carrying fluid and which transmit the heat to the conductive fluid by convection. These tubes, like those of the emulsifier, have an electrically equipotential surface and can be made of metal. But they must then be insulated electrically from each other. In this case, the heat-carrying fluid is preferably an electrical insulator, for example, a gas, to avoid outside electric circulation currents in the said fluid; as a heat-carrying fluid can be selected here the active gas itself, hot and under pressure. It suffices then to circulate this gas in the tubes in question by recycling in a closed circuit comprising outside reheating in a suitable source.

These heat supply tubes could be placed at various points of the loop. In general, they could be located preferably just upstream of the emulsifier.

It is also possible to make this heat supply device play at least partly the role of an emulsifier; it suffices to circulate the useful gas itself, hot and under pressure, reheated by recycling in a closed circuit, as described above, and in addition to provide a great number of very fine holes in at least a part of the aforesaid heat supply tubes; in this case only a fraction of the gas flow is injected into the liquid in the form of bubbles, and the rest is recycled.

The loop of FIG. 1 has the inconvenience of presenting to the magnetic field a relatively large surface. However, other embodiments of the inventive concept which will now be described do not have this disadvantage.

In the embodiment represented in FIGS. 3 and 4, the pipe 17, which conducts the conductive fluid from the separator 15 to the emulsifier 14, is placed under pipe 16 leading from the emulsifier to the separator, which reduces the plan surface of the assembly.

The pipes 16 and 17 must then be insulated electrically from each other by a horizontal wall at the points where their vertical walls A and B are superposed, because they do not have the same potential (A is superposed on B on one side, and B on A on the other).

In these figures; 14a and 15a designate respectively the inlet for the gas into the emulsifier 14 and the outlet for this gas from separator 15.

It should be noted that the connection of the emulsifier 14 with the pipe 17 is realized according to the invention by a spiral connection 18 similar to that realized by the separator 15. This reverses the plan positions of the side walls A and B of the pipes 16 and 17 to obtain a correct distribution of the electric potentials; in fact, since the velocities of the fluid have opposite signs, the potentials must be reversed.

These spiral connections, just like the separators, occupy a relatively large space, which is an increasing function of the width of the pipes 16, 17. In order to reduce it, one can connect several loops having pipes of a lesser width.

FIGS. 5 and 6 show in a plan view and in a profile a connection of two loops, whose pipes have a width equal to about half that of the pipes of FIG. 3. In one, the conductive fluid flows from the emulsifier 19 to the separator 20 through the pipe 21 and returns to the emulsifier 19 through the pipe 22, which is arranged in a lower plane. In the other, the fluid flows from the emulsifier 23 to the separator 24 through the pipe 25 arranged above the pipe 22. It returns to the emulsifier 23 through the pipe 26 placed below pipe 21. The direction of circulation of the fluid in one loop is thus opposite to that in the other loop. By shifting one loop longitudinally with regard to the other, one can superpose their pipes, as indicated in the figures. The result is a reduction of the transverse encumbrance at the ends and a reduced height of the separator.

FIG. 7 shows only in a plan view a variant of the preceding arrangement in which the pipes of the dual loops have been brought so close together that they have common vertical walls, which can be eliminated at least partially. These two loops are then connected in parallel to the fluid flow and in series electrically, so that the voltage at the electrodes is doubled. FIG. 7 derives from FIG. 5. The latter shows, in plan view, two bends which are superimposed, in such a way that the branch of one 21, 25 which contains the emulsion is above (in the sense of the magnetic field) of the branch 22, 26 of the other, which only contains the liquid. In order to obtain the arrangement according to FIG. 7, the branches 21 and 25, on the one hand, and the branches 22 and 26 on the other of FIG. 5 are imagined as having been brought closer together until their facing walls B touch. Since the branches 21 and 25 have thus been brought side by side and are traversed by a fluid of the same composition which is circulating in both in the same direction, it is possible to eliminate their common wall B. A single branch is thus obtained. This is the branch 30 of FIG. 7. Similarly, the combining of branches 22 and 26 of FIG. 5 results in the single branch 31 of FIG. 7. This branch 31 is below the branch 30, and it is seen at the right-hand end of the figure.

The plant comprises also a double emulsifier 27, two separators 28, 29, a pipe 30 for the fluid extending from the emulsifier to the separators, a pipe 31 below the pipe 30 for the return flow from the two separators to the emulsifier, this return being effected in two parts by spiral connections 32, 33 traversed in reverse direction.

FIG. 8 shows the arrangement obtained by connecting a certain number of pairs of loops similar to that of FIG. 5 to a pair of loops according to FIG. 7, and by eliminating the contiguous walls of the pipes on the same plane.

In this case one sees that the separators are always connected in pairs, turning in inverse direction and having potentials equally distant from those of the outer walls A and B, which are of interest due to the fluid streams symmetrical with regard to the median of the general flux.

Guide walls, such as 34, can be added to ensure a correct fractioning of the flow of the fluid. Their active surfaces, being parallel to the magnetic field, are equipotential.

FIG. 9 shows another way of connecting some pairs of separators with vortices turning in reverse direction.

The separators are no longer all on the same line, but on two parallel lines, all vortices turning in the same direction being on one of these lines and the others on the other.

This figure shows only the separators in a plan view and their access since the connections at the other are not principally different from those in FIG. 8.

One sees that loops, such as those described above, can only function once they have been started, that is, once the liquid is set in motion; they are not self-starting by themselves.

A simple means of achieving this is to pass an electric current between the generating electrodes (it is assumed that the magnetic field has been produced), in a direction opposite to the direction of the useful current, in other words, to apply to the electrodes a potential difference of the same sign (though preferably lower) than that to be produced. This sets the liquid in rotation in the loop and as soon as sufficient velocity has been attained, a pressure gas can be injected. The external electric current is then reversed and the loops become generators.

There have been described above magnetohydrodynamic loops which produce electric energy (hence not loops in general) thanks to the expansion of a gas under pressure.

But the invention concerns also loops (generally colder in this case) which absorbs electric energy in order to compress a gas.

These loops comprise exactly the same elements as those described above and in the same order. Only the evolution of the flow cross sections and particularly of the heights will be different, as well as, due to this fact the direction of flow of the energy.

The emulsifier can remain unchanged.

The generator where the emulsion circulates becomes a magnetohydrodynamic compressor and absorbs electric energy; the volumetric weight increases in the direction of flow; its flow cross section decreases generally and the gas bubbles are compressed there.

The separator can remain unchanged and the portion of the pipe following it generally, in this case, generates energy by the expansion of the conductive liquid.

I claim:

1. In a power plant operating on the magnetohydrodynamic principle for transformation of energy and wherein flow of an electro-conductive fluid is confined to at least one self-contained loop circuit which traverses at least one magnetohydrodynamic conversion apparatus with a transverse magnetic field, the improvement wherein said loop circuit and all parts of said conversion apparatus traversed by said electro-conductive fluid are located completely in said magnetic field so that none of the electro-conductive fluid either enters or leaves said field, and wherein means are provided to inhibit circulation of eddy currents within said fluid.

2. A power plant of the magnetohydrodynamic type as defined in claim 1 wherein said magnetic field is constant in size and direction at any point in said loop circuit, the flow of said electro-conductive fluid is continuous and with the lines of flow substantially plane and perpendicular to said magnetic field, and the height of said electro-conductive fluid parallel to the direction of said magnetic field is inversely proportional to the volumetric weight of said electro-conductive fluid at any such point except at the generating and receiving regions of said loop circuit in view of the ohmic drops in said fluid in said regions.

3. A power plant of the magnetohydrodynamic type as defined in claim 1 and which includes an emulsifier unit in one portion of said loop circuit, said emulsifier unit being comprised of cylindrical tubes provided with a plurality of hot gas outlet holes immersed in an electro-conductive liquid fluid, said cylindrical tubes having generatrices which are parallel to the direction of said magnetic field.

4. A power plant of the magnetohydrodynamic type as defined in claim 3 wherein the gas is re-cycled through said tubes of said emulsifier unit in order to effect at least a part of the exchange of heat in said electro-conductive fluid.

5. A power plant of the magnetohydrodynamic type as defined in claim 1 and which includes an emulsifier unit in one portion of said loop circuit, said emulsifier unit being comprised of cylindrical tubes provided with a plurality of hot gas outlet holes immersed in an electro-conductive liquid fluid, said cylindrical tubes having generatrices which are parallel to the direction of said magnetic field, and which further includes a gas-liquid separator unit of the vortex type in another portion of said loop circuit downstream from said emulsifier unit and downstream of the region of energy transformation, said separator unit including an outlet pipe for gas located inside said loop circuit and with its axis parallel to said magnetic field, and an inlet to and outlet from said separator unit of the same radii for said electro-conductive fluid.

6. A power plant of the magnetohydrodynamic type as defined in claim 5 wherein the duct forming that portion of said loop circuit between said separator and emulsifier units includes energized electrode means for operation as a magetohydrodynamic pump.

7. A power plant of the magnetohydrodynamic type as defined in claim 5 wherein said emulsifier and separator units are located remotely from each other in said loop circuit, one duct portion of said loop circuit extending from said separator unit to said emulsifier unit being located beneath another duct portion of said loop circuit extending from said emulsifier unit to said separator unit, and the connections at the ends of said duct portions having spiral configurations which reverse the relative positions of the duct walls which are parallel to said magnetic field.

8. A power plant of the magnetohydrodynamic type as defined in claim 1 in which a pair of self-contained loop circuits are provided for circulation of an emusified electro-conductive fluid, the respective emulsified electro-conductive fluids in said loop circuits turning in opposite directions, the ducts forming said loop circuits being superposed and each said loop circuit including an emulsifier and a gas-liquid separator for separating the gas from the liquid downstream from the energy transformation region in said loop circuit, said separators being juxtaposed.

9. A power plant of the magnetohydrodynamic type as defined in claim 8 in which duct portions of the said loop circuits located in the same plane are united into a single duct except at the ends thereof, said emulsifiers for said loop circuits being combined into a single unit, but said separators being structurally individual to said loop circuits.

10. A power plant of the magnetohydrodynamic type as defined in claim 8 wherein a plurality of said pairs of loop circuits are provided and wherein said separators belonging to said pairs of loop circuits are connected in groups of two turning in the reverse directions.

11. A power plant of the magnetohydrodynamic type as defined in claim 9 wherein a plurality of said pairs of loop circuits are provided and wherein said separators belonging to said pairs of loop circuits are connected in groups of two turning in the reverse directions.

12. A power plant of the magnetohydrodynamic type as defined in claim 8 wherein a plurality of said pairs of loop circuits are provided and which include guide walls in the loops for ensuring proper fractioning at the ends of the loops.

No references cited.

MILTON O. HIRSHFIELD, *Primary Examiner.*

D. X. SLINEY, *Assistant Examiner.*